May 24, 1960
H. HERRMANN
2,937,621
PNEUMATIC ENGINE
Filed July 9, 1958
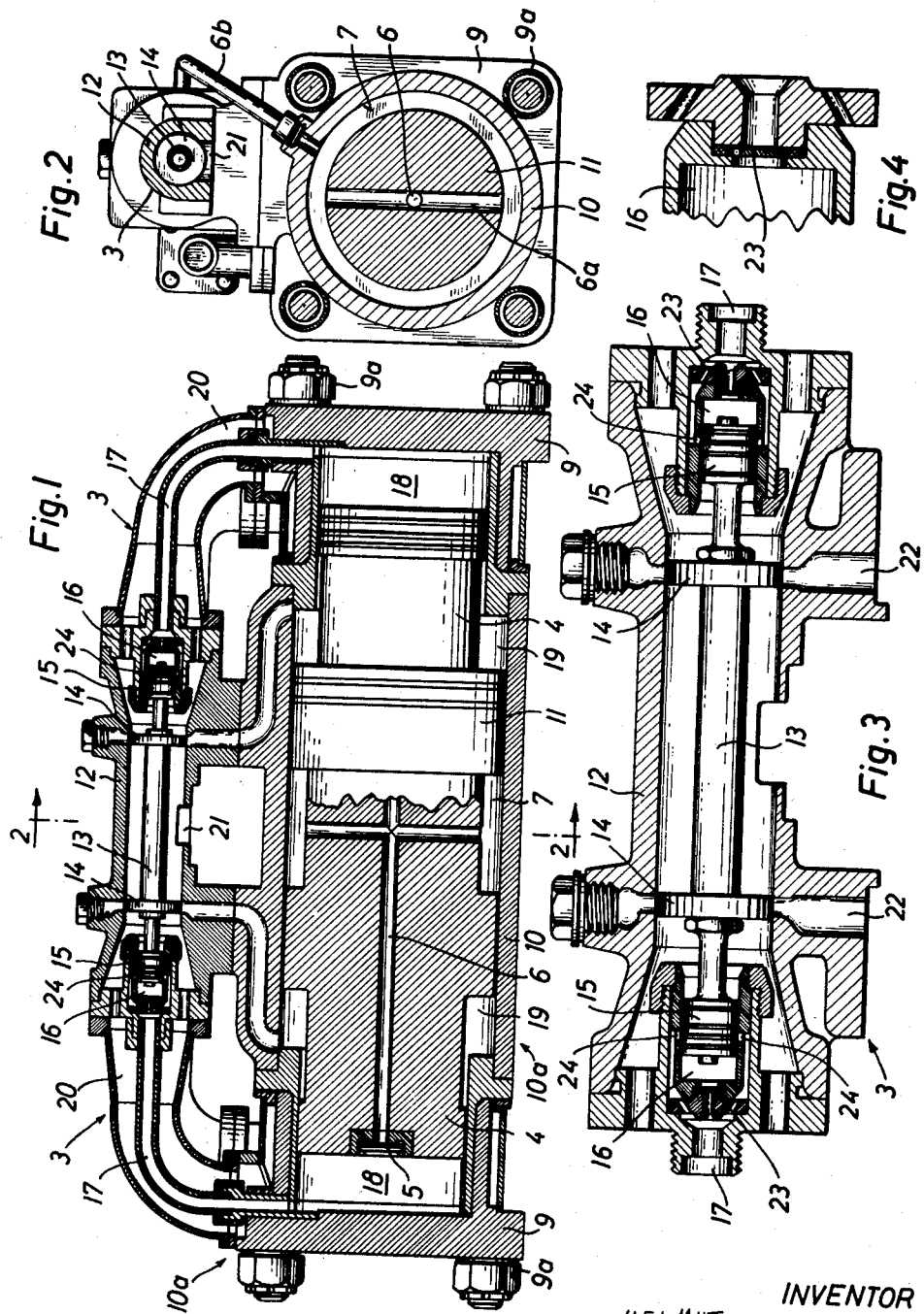
INVENTOR
HELMUT HERRMANN
BY
Burgen, Dinklage & Sprung
ATTORNEYS ial No. 747,434

Claims priority, application Germany July 13, 1957

3 Claims. (Cl. 121—16)

The present invention relates to pneumatic engines. More particularly, it relates to a piston kinetic-energy engine suitable for use as a vibration producer.

In application Serial Number 599,559, filed July 23, 1956, now Patent No. 2,867,191. There is described and claimed a piston kinetic-energy engine which can be used as a vibration producer for driving, in particular, devices for the mining and loading of coal. The control of the operating air is effected in this connection by a slide valve which in its turn is moved back and forth by pistons which are acted on the varying pressure of air cushions provided for the main piston. The greater the speed of vibration, the greater the difficulties in elastically intercepting the control slide at its end positions. On the one hand, the control slide must be sufficiently strong since its motion must take place in one quarter of the time required for the motion of the working piston. The kinetic energy imparted the control slide must, however, be elastically taken up in the end positions. If springs were provided for this purpose, violent recoils could not be avoided. The springs would soon be destroyed. The object of the present invention is a limiting of the control slide in its end positions which is obtained without substantial additional expense and furthermore operates with absolute dependability.

A novel feature in accordance with the invention is that the two cylinders for the actuating pistons of the control slide are simultaneously developed as air-cushion chambers which serve to delimit the movements of the control slide. For this purpose, each cylinder is provided on the one hand in its end surface with an opening with check-valve and furthermore in its cylindrical wall with openings which are alternately covered and exposed by the piston. Upon the working stroke, the compressed air enters the piston through the opening check valve. The piston is pushed back and in its turn effects a displacement of the control slide. As soon as the piston then exposes the openings in the cylindrical wall, further compressed air passes through them behind the piston and in its turn results in an accelerated displacement of the control slide on its path. When the control slide, and with it, the said actuating piston swing backward, the latter soon covers the slits in the cylindrical wall, and the check valve closes. The piston, upon the further movement of the control slide can now only compress the air enclosed in the rear cylinder. By this work, the kinetic energy of the control slide with the actuating piston or pistons is very rapidly and gently destroyed in the desired manner and the slide can therefore be intercepted without rebound in the end positions.

One embodiment by way of example of the invention is shown in the accompanying drawing in which:

Fig. 1 is a longitudinal section through the vibration producer;

Fig. 2 is a cross-section along the line 2—2 of Fig. 1;

Fig. 3 is a longitudinal section through the control on a larger scale;

Fig. 4 is an enlarged view of a portion of the engine shown in Fig. 3, particularly showing the check valve arrangement employed according to the embodiment shown in the drawing.

The engine shown in the drawing is of the type disclosed in the aforementioned application, Serial No. 599,559, filed July 23, 1956, now Patent No. 2,867,191. The engine comprises a double acting main piston-cylinder arrangement 10a formed by main piston 11 and the main cylinder which includes housing 10 and heads 9. Bolting 9a secures these cylinder parts together. The main piston 11 is provided with axially outwardly extending extensions 4 which are slidably received in the cylinder heads 9. The piston-cylinder arrangement provides working chambers 19, center chamber 7, and cushioning chambers 18. Means including a control head 3 are provided for alternately communicating first one side of the main piston then the other side of the main piston with a compressed gas source and simultaneously, respectively, communicating the one side and then the other side of the main piston with a relatively low pressure, for example atmospheric pressure. Thus, provision is made for communicating alternately the working chambers 19 with a source of compressed gas and a relatively low pressure.

The cushioning chambers 18 provide for alternately developing first on one side and then on the other side of the piston-cylinder arrangement pressure opposing reciprocation of the main piston and, simultaneously, respectively, developing a pressure less than the opposing pressure on first the one side and then the other side of the main piston. The center chamber 7 is communicated by pipe 6b with the compressed gas source, and the center chamber in turn communicates pressure from this source to the cushioning chambers 18 via passageways 6 and 6a disposed in the main piston 11. Check valves 5 are disposed at the outwardly disposed ends of the passageway 6 and function so that gas is compressed in each of the cushioning chambers as its main piston extension moves into the chamber, and so that gas is admitted to each cushioning chamber as its extension moves out of the chamber. Thus, each stroke of the main piston is pneumatically arrested.

According to the invention, the control valve means or control head 3 includes valves 14 and these valves are operated by an actuating piston-cylinder arrangement including actuating pistons 15 and actuating cylinders 16. The actuating piston-cylinder arrangement is communicated with and is arranged for response to a relatively high pressure operatively communicating with the main piston cylinder arrangement, for example with the opposing pressure which develops in the cushioning chambers 18, and a relatively low pressure operatively communicating with the main piston cylinder arrangement, for example the pressure less than the opposing pressure developed in the cushioning chambers 18. Thus the actuating piston-cylinder arrangement is effective to control the valving action of the control valve means.

According to the invention, each stroke of the actuating piston-cylinder arrangement is pneumatically arrested. This is accomplished by limiting communication of the actuating piston cylinder arrangement with the relatively low pressure operatively communicating with the main piston cylinder arrangement.

As is more fully explained in the aforementioned copending application, Serial Number 599,559, filed July 23, 1956 now Patent No. 2,867,191, the pressure in the center chamber 7 can be the line pressure, i.e., the pressure of the compressed gas source, or some lesser pressure. Preferably, the pressure in the center chamber 7 is not substantially less than the line pressure and conveniently the center chamber is vented directly to the line pressure, or a pressure slightly less than line pressure if the means described in the aforementioned Patent No. 2,867,191, particularly Fig. 2 thereof to maintain a slightly less than line pressure and thereby facilitate operation of the engine, are employed.

Considering now details of the construction of the device shown in the drawing, on the housing 10 of the vibratory engine in which the main piston 11 moves, there is fastened the control housing 12. In the control housing 12, there is provided the control valve 13 with the control edges 14; the control slide bears in axial extension small actuating pistons 15 which move in the cylinders 16. These cylinders 16 are connected via the pipelines 17 with the compression chambers 18 of the vibratory engine. The control slide 13 controls the varying feed of compressed air to the working chambers 19. The entrance of compressed air into the control housing 12 takes place through chamber 20. In the center of the control housing 12, there is provided the outlet 21 to a reduced pressure, for example, atmospheric pressure.

In the showing on a larger scale in Fig. 3 of the drawing, the control slide 13 is shown in its central position so that the two channels 22 are closed by the control edges 14.

The actuating cylindrical chambers 16 behind the actuating pistons 15 are in communication with the connecting conduits 17 on the one hand via the check valve 23. An additional connection, however, is also provided by the openings 24 in the cylindrical wall. These openings are covered or exposed by the actuating pistons 15 depending on their position.

If for instance the pressure in the right hand compression chamber 18 is greater than on the left hand side of the main piston 11, the compressed air entering the control housing from the right hand side displaces the control slide 13 to the left. The left actuating piston 15 pushes back the air contained in the left actuating cylinder chamber 16. First of all, the compressed air escapes on the left hand side from the cylinder chamber through the openings 24 in the actuating cylindrical wall. As soon as these openings, however, are covered by the piston 15, the rest of the air can no longer escape since the left check valve has automatically closed. The left hand actuating piston 15 then effects a compression of the remaining air in the cylinder chamber 16 whereby the control valve 13 is elastically intercepted.

I claim:
1. A double acting piston-cylinder arrangement including a main piston and main cylinder, means including control valve means for alternately communicating first one side and then the other side of the main piston with a compressed gas source and simultaneously, respectively, communicating the said other side and the said one side of the main piston with a relatively low pressure, cushioning means for pneumatically arresting each stroke of the main piston-cylinder arrangement, said cushioning means including means for alternately developing first one side and then on the other side of the piston-cylinder arrangement pressure opposing reciprocation of the main piston-cylinder arrangement, and simultaneously, respectively, developing a pressure less than the opposing pressure on first the said other side and then the said one side of the piston of the main piston-cylinder arrangement, said control valve means including an actuating piston-cylinder arrangement communicating with and responsive to said opposing pressure and said pressure less than the opposing pressure, and being effective to control the valving action of the control valve means, the improvement which comprises means for limiting communication of the actuating piston-cylinder arrangement with the pressure less than the opposing pressure, whereby each stroke of the actuating piston-cylinder arrangement is pneumatically arrested.

2. The improvement according to claim 1, said actuating piston-cylinder arrangement including conduit means for communicating an actuating cylinder and pressure less than the opposing pressure, said means for limiting communication of the actuating piston-cylinder arrangement with pressure less than opposing pressure comprising means defining an opening in the cylinder wall of the actuating cylinder communicating the actuating cylinder with pressure less than the opening pressure and positioned to be sealed by the actuating cylinder in the course of its stroke and a check valve position in said conduit means and effective to seal the actuating cylinder from the pressure less than the opposing pressure.

3. In a double-acting piston-cylinder arrangement including a main piston and main cylinder, means including control valve means for alternately communicating first one side and then the other side of the main piston with a compressed gas source and simultaneously, respectively, communicating the said other side and then the said one side of the main piston with a relatively low pressure, said control valve means comprising an actuating piston-cylinder arrangement communicated with and responsive to a relatively high pressure operatively communicating with the main piston-cylinder arrangement and a relatively low pressure via a flow path operatively communicating with the main piston-cylinder arrangement and being effective to control the valving action of the control valve means, the improvement which comprises air cushion chamber means disposed within the flow path of the relatively low pressure between the actuating piston-cylinder arrangement and the main piston-cylinder arrangement and cooperating with said actuating piston-cylinder arrangement for limiting communication of the actuating piston-cylinder arrangement with said relatively low pressure operatively communicating with the main piston-cylinder arrangement, whereby each stroke of the actuating piston-cylinder arrangement is pneumatically arrested.

References Cited in the file of this patent
UNITED STATES PATENTS
2,867,191   Herrmann _____ Jan. 6, 1959